(No Model.)

L. B. FAVOR.
THERMAL CUT-OUT.

No. 431,718. Patented July 8, 1890.

WITNESSES:
J. O. Finch
Chas. H. Fleming

INVENTOR
Lorenzo B. Favor
BY
F. W. Smith
ATTORNEY

UNITED STATES PATENT OFFICE.

LORENZO B. FAVOR, OF BRIDGEPORT, CONNECTICUT, ASSIGNOR TO THE THERMAL ELECTRIC COMPANY, OF MAINE.

THERMAL CUT-OUT.

SPECIFICATION forming part of Letters Patent No. 431,718, dated July 8, 1890.

Application filed April 14, 1890. Serial No. 347,777. (No model.)

*To all whom it may concern:*

Be it known that I, LORENZO B. FAVOR, a citizen of the United States, residing at Bridgeport, in the county of Fairfield and State of Connecticut, have invented certain new and useful Improvements in Electrical Thermal Cut-Outs; and I do hereby declare the following to be a full, clear, and exact description of the invention, such as will enable others skilled in the art to which it appertains to make and use the same.

My invention refers to what are known as "electrical thermal cut-outs," and has for its object to provide a device of this description which is especially adapted to be secured to a wall or upon a table convenient of access, and which shall automatically relieve a low-tension electrical circuit from any high-tension current that may accidentally cross or come in contact with said circuit.

Figure 1:
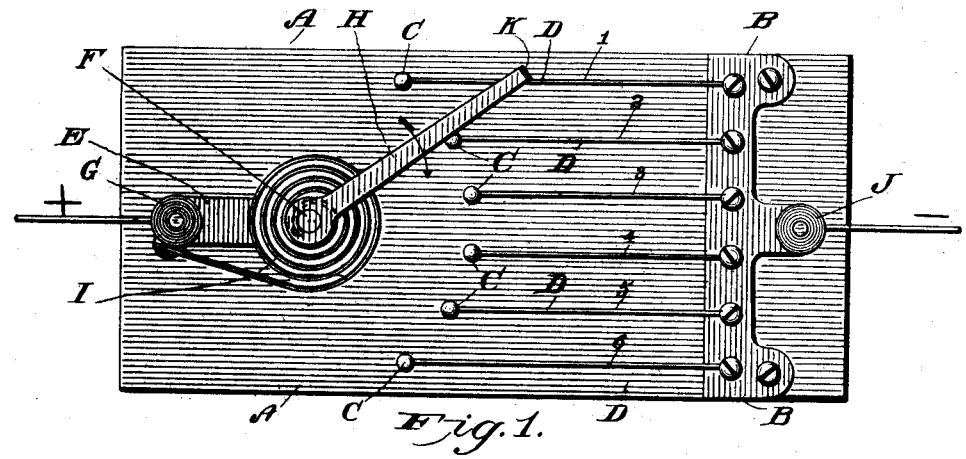
Figure 2:
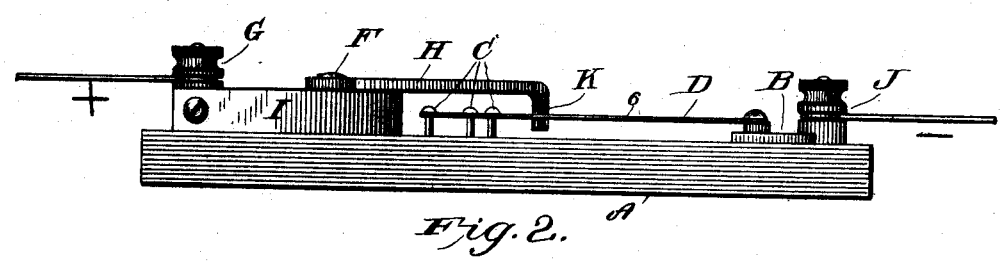

In the accompanying drawings, Figure 1 is a front elevation of my improvement; Fig. 2, a side elevation.

Similar letters and numerals denote like parts in the two figures of the drawings.

A is any suitable base of non-conducting material, and B a conductor-bar secured thereto.

C are pins, which project from said base at a suitable distance from the bar B, and D are fusible wires attached at one end to said pins and at the other end to said bar.

E is a conductor-plate secured to the base and having at the inner end a rotary short shaft F and at the outer end a binding-post G, both the shaft and post being in electrical circuit with the plate. H is an arm secured to said shaft so as to revolve therewith, and of such length as to have a radial sweep beyond the pins C.

I is a volute spring around the shaft F and secured at the inner end to the latter and at the outer end to any stationary object, as the post G. It will thus be seen that the action of the spring will tend to revolve the arm in the direction indicated by the arrow in Fig. 1.

The bar B is provided with a binding-post J in electrical contact therewith, to which one end of the line-wire is secured, the other end of said wire being secured to the post G. From the extremity of the arm H a finger K extends inside of the plane of the wires D, so as to come in contact with the latter when the arm revolves.

From the foregoing description the operation of my improvement will be obviously as follows: Suppose a high-tension current crosses or in any way gets in the circuit. The wire No. 1 immediately fuses, thereby opening the circuit, and the spring-actuated rotary arm will be operated to bring the finger K in contact with the next succeeding wire No. 2, whereby the circuit is automatically closed. Should the high-tension current remain permanently in the circuit, as in the instance of a cross, the operation of the arm H will cause the wires to be fused in rapid succession, and the circuit will therefore be permanently opened.

I do not wish to be limited in the manner shown and described of connecting the arm electrically to the line-wire, because the conductor-plate may be dispensed with and the shaft F journaled directly in the base A, in which instance the shaft would be electrically connected with the line-wire through the medium of the volute spring, the gist of my invention in this respect resting in the spring action of the arm and the electrical contact of the latter with the line-wire.

Having thus described my invention, what I claim as new is—

In a thermal cut-out for electrical purposes, the combination of the non-conducting base, the flat conductor-bar secured to said base, the pins secured at certain intervals within said base, the fusible wires connected to said bar and pins and extended in close proximity to said base and parallel thereto, the conductor-plate secured to said base, and the spring-actuated rotary arm mounted on said plate and having a depending finger adapted to engage with said wires, said bar and plate being respectively connected to the ends of the line-wire, substantially as set forth.

In testimony whereof I affix my signature in presence of two witnesses.

LORENZO B. FAVOR.

Witnesses:
BENJ. H. CORLISS, Jr.,
H. FRANK WILKES.